N. E. McMAHON.
CUFF BUTTON GUARD.
APPLICATION FILED MAR. 21, 1916.
1,211,469.
Patented Jan. 9, 1917.
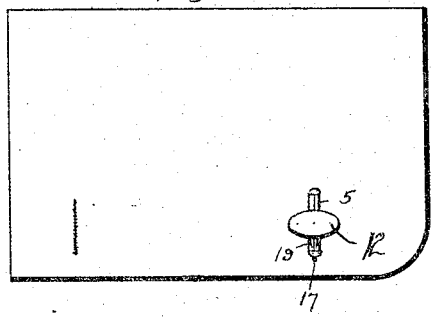
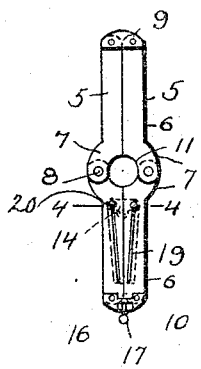
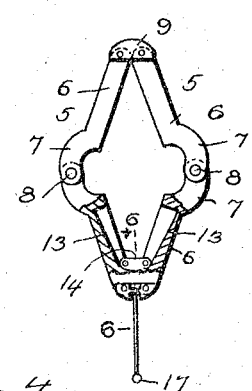
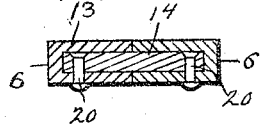
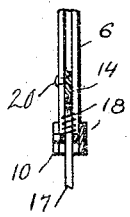
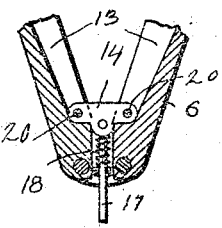
Inventor
N. E. McMahon

UNITED STATES PATENT OFFICE.

NORA E. McMAHON, OF COLUMBIA, TENNESSEE.

CUFF-BUTTON GUARD.

1,211,469. Specification of Letters Patent. Patented Jan. 9, 1917.

Application filed March 21, 1916. Serial No. 85,656.

*To all whom it may concern:*

Be it known that I, NORA ELIZABETH McMAHON, a citizen of the United States, residing at Columbia, in the county of Maury and State of Tennessee, have invented certain new and useful Improvements in Cuff-Button Guards; and I do hereby declare the following to be a full, clear, and exact description of the invention, such as will enable others skilled in the art to which it appertains to make and use the same.

This invention has for its object to provide a simple and conveniently operable guard particularly designed for use in connection with link cuff buttons to prevent the relatively small head at one end of the link from slipping through the button holes of the cuff and the cuff button being subsequently lost.

With this and other objects in view, the invention consists in the novel construction, combination and arrangement of parts as will be hereinafter specifically described, claimed and illustrated in the accompanying drawing, in which:

Figure 1 represents a side elevation of the guard applied to use, Fig. 2 represents an enlarged side elevation of the guard removed, Fig. 3 represents a side elevation of the guard, partly in section, the parts being shown in open or inoperative position, and Fig. 4 represents a detail sectional view on the line 4—4 of Fig. 1. Fig. 5 represents an enlarged detail sectional view through the guard, partly broken away, and Fig. 6 represents a detail sectional view on the line 6—6 of Fig. 3.

Referring to the drawing in detail, wherein similar reference numerals designate corresponding parts throughout the several views, the numerals 5 indicate a pair of sectional side members, each of which includes a pair of bars 6, having their adjacent ends offset, as indicated at 7, and pivotally connected by a pivot pin 8. The ends of the side members are pivotally connected by end plates 9 and 10, and, when closed, the side members present a substantially circular opening 11 at the offset portions 7 thereof, designed to receive the shank or link of a link cuff button 12, as illustrated in Fig. 1.

The inner edges of two of the opposed bars 6 are formed with grooves 13, having inclined outer walls and in which is slidably mounted a block 14 adapted, when moved outwardly with relation to the longitudinal center of the guard to separate the side members 5, as illustrated in Fig. 3. A chain or other flexible member 15 is extended through an apertured ear 16 in the end plate 10, provided at one end with a handle 17 and connected at its opposite end with the block 14, whereby the latter may be actuated to separate the side members of the guard. The block 14 is normally retained in inwardly extended position by the tension of a spring 18 coiled about the flexible members 15 intermediate the apertured ear 16 and the block 14.

Slots 19 are formed in one side wall of each groove 13, are inclined correspondingly with the outer wall of the groove and slidably receive a pin 20 at the adjacent end of the block 14, whereby inward movement of the latter under the influence of the spring 18 effects a closing movement of the side members 5, whereby the latter are resiliently retained in engagement with the shank of the link cuff button 12, so as to prevent loss of the latter.

What I claim is:

1. A cuff button guard including a pair of sectional side members, plates pivotally connecting the opposite ends of the side members, and means normally tending to close said side members.

2. A cuff button guard including a pair of sectional side members, the adjacent ends of the sections of each side member being offset to present an opening when the side members are closed adapted to receive the shank of a button, plates pivotally connecting the opposite ends of the side members, and means normally tending to close the side members.

3. A guard including a pair of sectional side members, the sections of each side member being pivotally connected and offset at their pivoted ends so as to present an opening for the reception of the shank of a button when the side members are closed, the inner edges of two of the opposed side members being formed with inclined grooves, an actuating block slidably mounted in said grooves, means normally tending to move said block inwardly, means for effecting a closing movement of the side members during inward movement of said block, and a flexible actuating member carried by said block.

In testimony whereof I affix my signature in presence of two witnesses.

NORA E. McMAHON.

Witnesses:
R. F. RIGSBY,
J. H. McMAHON.

Copies of this patent may be obtained for five cents each, by addressing the "Commissioner of Patents, Washington, D. C."